UNITED STATES PATENT OFFICE.

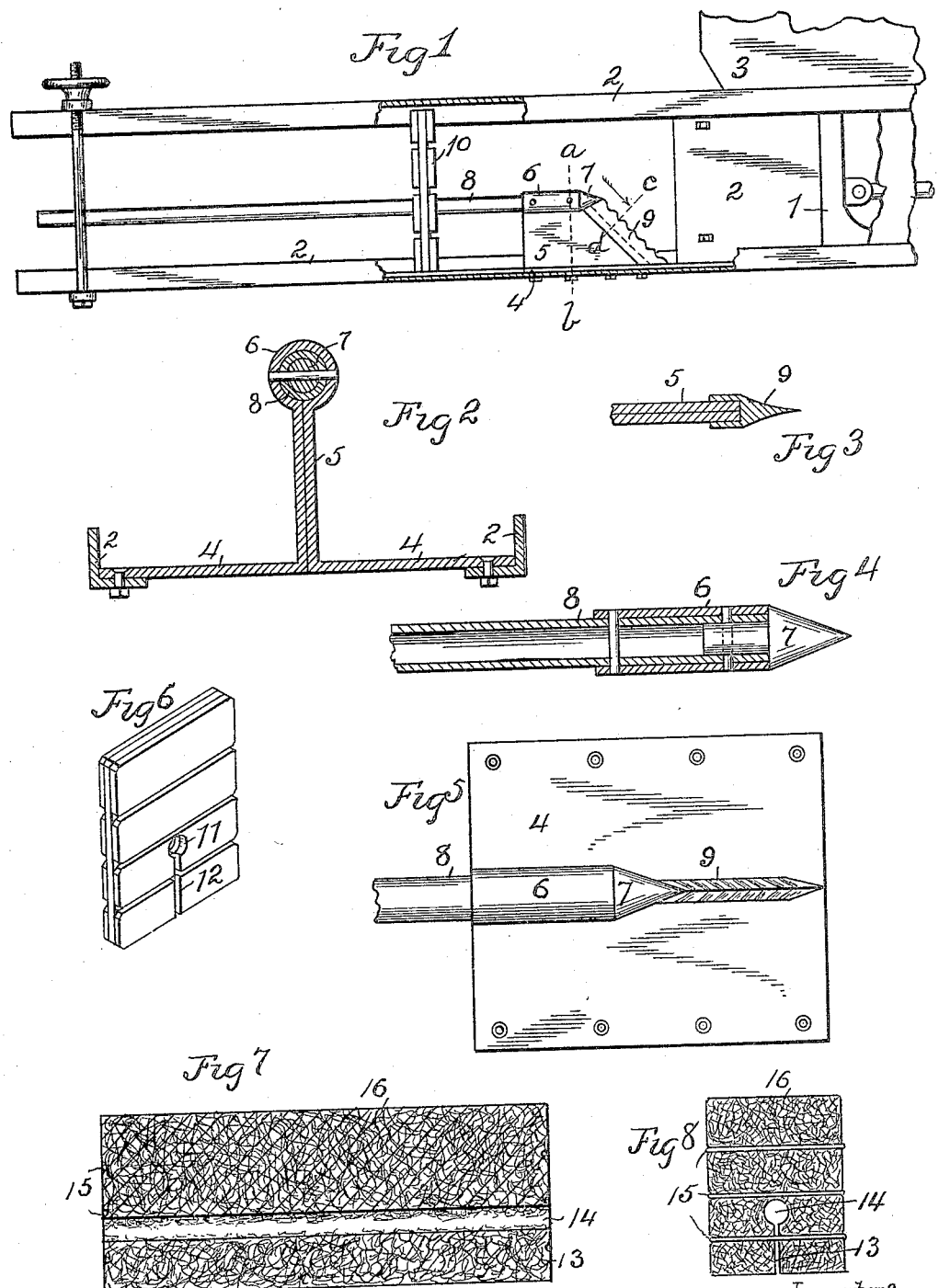

JOHN NORTH AND WILLIAM H. NORTH, OF KANSAS CITY, MISSOURI.

PROCESS FOR BALING HAY AND SIMILAR MATERIALS.

No. 817,932.     Specification of Letters Patent.     Patented April 17, 1906.

Application filed June 3, 1905. Serial No. 263,558.

*To all whom it may concern:*

Be it known that we, JOHN NORTH and WILLIAM H. NORTH, citizens of the United States, residing at Kansas City, in the county of Jackson and State of Missouri, have invented certain new and useful Improvements in Processes for Baling Hay and Similar Material, of which the following is a specification.

Our invention relates to improvements in processes of baling hay or similar material.

The object of our invention is to provide a process for baling hay in which the bale is formed with a longitudinal hole extending through the bale for the purpose of admitting air to the middle portion of the bale for preserving the bale from decay or deterioration.

Our invention provides, further, a process by which the side of the bale which is most tightly compressed is longitudinally divided during the formation of the bale from said side to the longitudinal hole through the bale, thus admitting air to have access to the most tightly-compressed portion of the bale.

Our invention provides, further, a bale of hay or similar material longitudinally perforated and divided, as above described.

Our invention provides, further, a process consisting in inserting the hay or similar material through one side of the baling-chamber, longitudinally compressing the material in said chamber and around a core and during compression longitudinally cutting the bale from one side to the cored portion.

Other novel features are hereinafter fully described and claimed.

In the accompanying drawings, which illustrate an apparatus for carrying into effect our improved process, Figure 1 is a side view, partly in elevation and partly in vertical section, of a portion of a baling-press provided with our improvement. Fig. 2 is a vertical section taken on the dotted line *a b* of Fig. 1. Fig. 3 is a cross-section taken on the dotted line *c d* of Fig. 1. Fig. 4 is a horizontal sectional view of a portion of the core. Fig. 5 is a top view of a portion of the core and cutting-blade. Fig. 6 is a perspective view of one of the baling-blocks. Fig. 7 is a longitudinal vertical sectional view of a bale of hay formed by our process. Fig. 8 is an end elevation view of a bale formed by our improved process.

1 denotes the reciprocating plunger, 2 the framework of the baling-chamber, and 3 the feed-hopper, of an ordinary hay-baling press. Upon the bottom of the baling-chamber forward of the feed-hopper 3 is mounted the core which forms the hole lengthwise through the bale. This core comprises, preferably, a horizontal portion 4, secured at its lateral edges upon the bottom of the baling-chamber 2 and having a longitudinal vertical portion 5, surmounted by a tubular longitudinal portion 6, in the forward end of which is secured a conical pin 7, in the rear end of which is secured the forward end of a horizontal longitudinal tube 8. The tubular portion 6 is located, preferably, in a medial line a little below the central portion of the chamber 2. The forward edge of the vertical portion 5 of the core is downwardly and forwardly inclined and has mounted thereon a cutting-blade 9, the cutting edge of which is preferably undulatory in form.

10 denotes one of a series of blocks between which the hay is compressed. Each block 10 is provided with a transverse hole 11, adapted to receive the tubular portion 6 of the core. Each block is also provided with a slot 12, extending from the lower edge of the block to the hole 11. The slot 12 is to permit the passage of the block 10 past the blade 9 and vertical portion 5 of the core.

In operating our invention the hay is fed downwardly through the feed-hopper 3 in a series of installments in the manner common to baling-presses of this character. The several installments form the layers composing the bale. As each layer is fed forward it is formed around the tubular portions 6 and 8, which form a hole from end to end through each layer. That portion of each layer below the core 6 is divided from the lower edge to the hole formed by the tubular portion 6 by the cutting-blade 9. This portion of the bale is always the portion most densely compressed and by thus dividing it, after the bale has been formed and tied, a longitudinal air-space is formed lengthwise through the bale 16, as denoted by the vertical slot 13 and hole 14. (Shown in Fig. 8.) After a sufficient number of layers to form a bale have been inserted and compressed in the baling-chamber the bale is tied in the ordinary manner by passing the bale-tie wires 15 lengthwise around the bale, after which the bale is ejected from the chamber in the ordinary manner.

Our invention is subjective to various modifications without departing from its spirit.

Having thus described our invention, what we claim, and desire to secure by Letters Patent, is—

1. The process consisting in compressing the hay or similar fibrous material around a core to form a bale, and during compression longitudinally cutting the bale from one side to the cored portion.

2. The process consisting in consecutively compressing a series of layers of hay or similar fibrous material, transversely perforating each layer during compression and then arranging the several layers to form a bale with the several perforations in alinement with each other.

3. The process consisting in consecutively compressing a series of layers of hay or similar fibrous material, transversely perforating each layer during compression from end to end and from one edge toward the middle of the layer and arranging the layers to form a bale with the several perforations in alinement with each other.

4. The process consisting in consecutively compressing around a core a series of layers of hay or similar fibrous material and during compression transversely cutting each layer from one edge to the core portion.

5. The process consisting in consecutively compressing a series of layers of hay or similar fibrous material, transversely perforating each layer during compression, arranging the several layers to form a bale with the several perforations in alinement with each other and then tying together the several layers.

6. The process consisting in consecutively compressing a series of layers of hay or similar fibrous material, transversely perforating each layer during compression from end to end and from one edge toward the middle of the layer, then arranging the layers to form a bale with the several perforations in alinement with each other and then tying the several layers together.

7. The process consisting in consecutively compressing around a core a series of layers of hay or similar fibrous material, transversely cutting, during compression, each layer from one edge to the cored portion, arranging the several layers to form a bale with the cored and cut portions in alinement with each other and then tying together the several layers.

8. A bale of hay or similar fibrous material comprising the material compressed to form a bale, the bale being perforated from end to end and longitudinally divided from one side to said perforation.

9. A bale of hay or similar fibrous material comprising the material compressed to form a bale, the bale being perforated from end to end and longitudinally divided from one side to the said perforation, a plurality of bale-ties longitudinally encircling the bale.

10. A bale of hay or similar fibrous material comprising a series of compressed layers of the material arranged end to end, each layer being perforated from end to end and longitudinally divided from one edge to the perforation therethrough, the perforations and divisions being disposed in alinement with each other.

11. A bale of hay or similar fibrous material comprising a series of compressed layers of the material arranged end to end, each layer being perforated from end to end and longitudinally divided from one edge to the perforation therethrough, the perforations and divisions being in alinement with each other, and a series of bale-ties embracing the layers and retaining them in the compressed condition.

12. The process consisting in forcing laterally into a baling-chamber a series of layers of hay or similar fibrous material, consecutively longitudinally compressing said series to form a bale and forming, during compression, a longitudinal hole extending through said layers from one end of the bale to the other.

13. The process consisting in inserting through one side of a baling-chamber a series of layers of hay or similar fibrous material, longitudinally compressing said series of layers to form a bale, forming, during compression, a longitudinal hole extending through said layers from one end of the bale to the other and dividing the layers lengthwise of the bale from said hole to the side opposite the side of the chamber through which the layers were fed.

14. The process consisting in inserting through one side of a baling-chamber a series of layers of hay or similar fibrous material, longitudinally compressing said series to form a bale, forming, during compression, a longitudinal hole extending through the layers from one end of the bale to the other, longitudinally dividing the layers from said hole to the side of the bale opposite the side of the chamber through which the layers were inserted and tying the layers together in the compressed condition.

In testimony whereof we affix our signatures in presence of two witnesses.

JOHN NORTH.
WILLIAM H. NORTH.

Witnesses:
WARREN D. HOUSE,
R. E. HAMILTON.